(12) United States Patent
Brewer

(10) Patent No.: US 11,105,351 B2
(45) Date of Patent: Aug. 31, 2021

(54) AGRICULTURAL BALER WITH HYDRAULIC FLOW CONTROLLER

(71) Applicant: CNH Industrial America LLC, New Holland, PA (US)

(72) Inventor: Carl M. Brewer, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 16/577,486

(22) Filed: Sep. 20, 2019

(65) Prior Publication Data

US 2021/0088059 A1 Mar. 25, 2021

(51) Int. Cl.

| | |
|---|---|
| *F15B 19/00* | (2006.01) |
| *F15B 21/08* | (2006.01) |
| *A01F 15/08* | (2006.01) |

(52) U.S. Cl.
CPC .......... *F15B 19/002* (2013.01); *A01F 15/085* (2013.01); *A01F 15/0883* (2013.01); *F15B 21/08* (2013.01); *F15B 21/085* (2013.01)

(58) Field of Classification Search
None
See application file for complete search history.

(56) References Cited

U.S. PATENT DOCUMENTS

| | | |
|---|---|---|
| 4,609,984 A | 9/1986 | Strosser et al. |
| 4,656,931 A | 4/1987 | Van Den Bossche et al. |
| 4,942,529 A * | 7/1990 | Avitan ............ B60L 15/20 701/50 |
| 5,581,976 A | 12/1996 | Underhill |
| 6,295,797 B1 | 10/2001 | Naaktgeboren et al. |
| 6,561,076 B2 | 5/2003 | Hou et al. |
| 6,581,695 B2 | 6/2003 | Bernhardt et al. |
| 6,644,006 B1 | 11/2003 | Merritt et al. |
| 6,688,092 B2 | 2/2004 | Anstey et al. |
| 6,877,304 B1 | 4/2005 | Smith et al. |
| 8,738,244 B2 | 5/2014 | Lenz et al. |
| 8,746,137 B1 | 6/2014 | Henry et al. |
| 8,776,679 B1 | 7/2014 | Henry et al. |

(Continued)

FOREIGN PATENT DOCUMENTS

JP 2016-77215 A 5/2016

*Primary Examiner* — Michael Leslie
(74) *Attorney, Agent, or Firm* — Peter Zacharias; Patrick Sheldrake

(57) ABSTRACT

A hydraulic system for an agricultural baler includes: a hydraulic motor; a hydraulically driven component fluidly coupled to the hydraulic motor such that fluid flow between the hydraulic motor and the hydraulically driven component causes the hydraulically driven component to move between a first position and a second position; a flow sensor associated with the hydraulically driven component; and a controller operatively coupled to the flow sensor and the hydraulic motor. The controller is configured to: enter a learning mode to learn a driven movement of the hydraulically driven component from the first position to the second position; determine fluid flow between the hydraulic motor and the hydraulically driven component during the driven movement while in the learning mode; associate the determined fluid flow with the driven movement; and output control signals to the hydraulic motor to reproduce the associated fluid flow and reproduce the driven movement.

20 Claims, 7 Drawing Sheets

(56) References Cited

U.S. PATENT DOCUMENTS

| | | | |
|---|---|---|---|
| 10,323,381 B2 * | 6/2019 | Fujii | E02F 3/437 |
| 10,653,067 B1 * | 5/2020 | Jones | A01D 85/005 |
| 2015/0272007 A1 | 10/2015 | Smith | |
| 2016/0333902 A1 * | 11/2016 | Hodel | F15B 19/002 |
| 2020/0367435 A1 * | 11/2020 | Jones | A01D 87/125 |

* cited by examiner

AGRICULTURAL BALER WITH HYDRAULIC FLOW CONTROLLER

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional bale forming chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The baler may be towed by a towing vehicle, such as a tractor, that also carries various systems for operating the baler. One such system is a hydraulic system, with the hydraulic system of the baler coupling to the hydraulic system of the tractor. Coupling between the hydraulic systems of the baler and the tractor is prone to error, which can result in undesired operation of the baler and/or tractor.

What is needed in the art is a baler that can address at least some of the previously described issues with known balers.

SUMMARY OF THE INVENTION

Exemplary embodiments disclosed herein provide a controller that can enter a learning mode to associate fluid flows with driven movements and cause the fluid flows to be reproduced and reproduce the driven movements.

In some exemplary embodiments provided according to the present disclosure, a hydraulic system for an agricultural baler includes: a hydraulic motor configured to output pressurized fluid; a hydraulically driven component fluidly coupled to the hydraulic motor such that fluid flow between the hydraulic motor and the hydraulically driven component causes the hydraulically driven component to move between a first position and a second position; at least one flow sensor associated with the hydraulically driven component and configured to output flow signals corresponding to fluid flow between the hydraulically driven component and the hydraulic motor; and a controller operatively coupled to the at least one flow sensor and the hydraulic motor. The controller is configured to: enter a learning mode to learn a driven movement of the hydraulically driven component from the first position to the second position; determine fluid flow between the hydraulic motor and the hydraulically driven component during the driven movement while in the learning mode; associate the determined fluid flow with the driven movement; and output control signals to the hydraulic motor to reproduce the associated fluid flow and reproduce the driven movement.

In some exemplary embodiments provided according to the present disclosure, an agricultural baling system includes a towing vehicle having a chassis and a hydraulic motor carried by the chassis and configured to output pressurized fluid and a baler coupled to the towing vehicle. The baler includes: a hydraulically driven component fluidly coupled to the hydraulic motor such that fluid flow between the hydraulic motor and the hydraulically driven component causes the hydraulically driven component to move between a first position and a second position; at least one flow sensor associated with the hydraulically driven component and configured to output flow signals corresponding to fluid flow between the hydraulically driven component and the hydraulic motor; and a baler controller operatively coupled to the at least one flow sensor and the hydraulic motor. The baler controller is configured to: enter a learning mode to learn a driven movement of the hydraulically driven component from the first position to the second position; determine fluid flow between the hydraulic motor and the hydraulically driven component during the driven movement while in the learning mode; associate the determined fluid flow with the driven movement; and output control signals to the hydraulic motor to reproduce the associated fluid flow and reproduce the driven movement.

In some exemplary embodiments provided according to the present disclosure, a method of controlling an agricultural baler is provided. The method is performed by a controller and includes: entering a learning mode to learn a driven movement of a hydraulically driven component from a first position to a second position; determining fluid flow between a hydraulic motor and the hydraulically driven component during the driven movement while in the learning mode, the fluid flow causing the driven movement of the hydraulically driven component; associating the determined fluid flow with the driven movement; and outputting control signals to the hydraulic motor to reproduce the associated fluid flow and reproduce the driven movement.

One possible advantage that may be realized by exemplary embodiments disclosed herein is that the controller associating fluid flows with the driven movement can reduce the impact of an operator incorrectly coupling the hydraulically driven component to the hydraulic motor.

Another possible advantage that may be realized by exemplary embodiments disclosed herein is that the controller entering the learning mode can reduce the amount of time it takes to setup various hydraulically driven functions of the baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
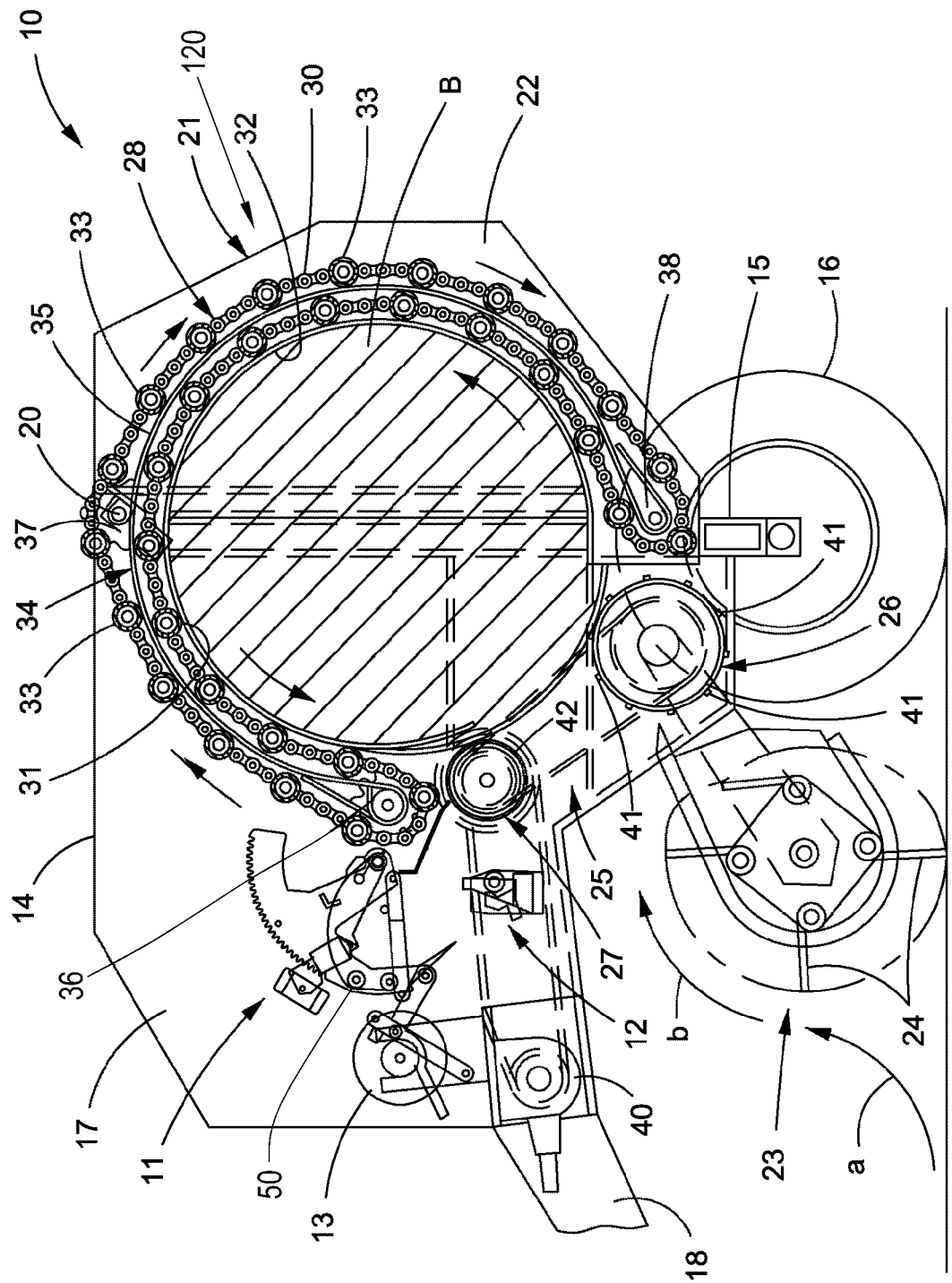
FIG. 1 illustrates a sectional view of an exemplary embodiment of an agricultural baler including a tailgate assembly, provided in accordance with the present disclosure.
Figure 2:
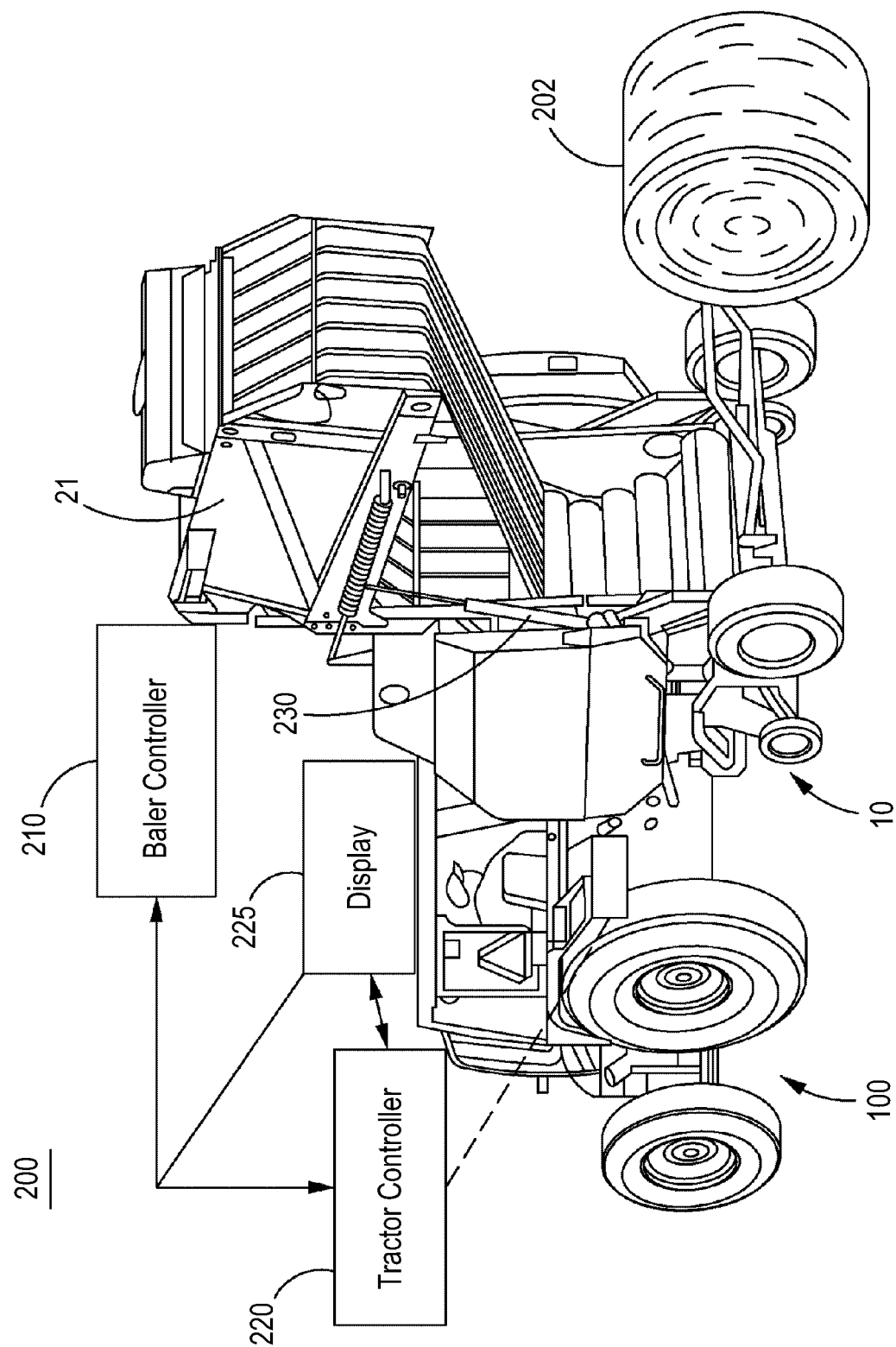
FIG. 2 illustrates a perspective view of a tow vehicle towing the baler of FIG. 1.

FIG. 1 depicts an exemplary agricultural round baler, generally designated 10. As previously noted, crop in the field is usually arranged in a windrow as it is engaged by the baler 10 being pulled along the windrow of cut crop material by a towing vehicle, which may be in the form of a tractor 100 as illustrated in FIG. 2.

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a chassis 14 with a main support beam 15 on which a pair of wheels 16 (only one shown) are rotatably affixed. The chassis includes a pair of side walls between which a cylindrical bale forming chamber extends. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed (as shown in FIG. 1) during bale formation or pivoted open about stub shafts 20 to discharge a completed bale. The tailgate 21 is part of a tailgate assembly 120. The tailgate 21 includes tailgate walls 22 coextensive with side walls 17. A pickup assembly 23 mounted on chassis 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

FIG. 2 illustrates an exemplary embodiment of a baling system 200 provided according to the present disclosure. The baling system 200 includes the baler 10 with a baler controller 210 and the tractor 100 with a tractor controller 220 and a display 225 accessible by an operator in the tractor 100. The display 225 allows for the operator to see various control and status information as well as to enter and configure information for use by the tractor controller 220 and the baler controller 210. The tractor controller 220 and the baler controller 210 are operatively coupled to one another for messaging and data communication, as is known. The display 225 is operatively coupled to the tractor controller 220 and may be operatively coupled to the baler controller 210 directly or indirectly through the tractor controller 220. In some embodiments, the tractor controller 220 and the baler controller 210 are integrated in an ISO-BUS system; in such embodiments, the controllers 210, 220 may communicate on the ISOBUS network. It should thus be appreciated that an ISOBUS system including the controllers 210 and 220 may also be the "controller" referred to herein.

In other embodiments, the baler 10 is not connected to the tractor 100 but is connected to other equipment, such as, for example, a harvester or a part of a harvester, such as a cotton picker, or the like. In these embodiments, the other equipment (e.g., harvester) may include a controller, similar to the tractor controller 220, and an operator interface, similar to the display 225.

As shown in FIG. 2, the tailgate 21 is in an open position with the bale 202 ejected from the baler 10. The bale 202 is fully formed and wrapped prior to ejection. In addition to the baler controller 210 and the components described above with reference to FIG. 1, the tailgate assembly 120 also includes a tailgate actuator 230, illustrated as a hydraulic cylinder, connected to the tailgate 21 to move the tailgate 21 between the closed position and the open position. The baler controller 210 may control a flow of fluid to the tailgate actuator 230; by controlling a hydraulic flow rate of the fluid to the tailgate actuator 230, the baler controller 210 controls opening and closing of the tailgate 21. Alternatively or in addition, the baler controller 210 may control activation of the tailgate actuator 230 to control opening and closing of the tailgate 21.

Figure 3A:
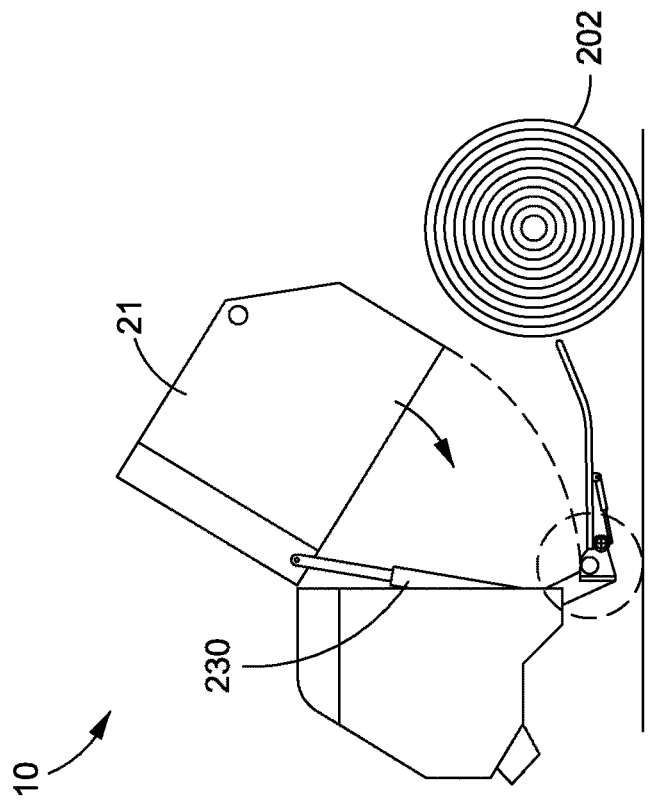
FIG. 3A illustrates a tailgate of the baler of FIGS. 1-2 ejecting a formed and wrapped bale.
Figure 3B:
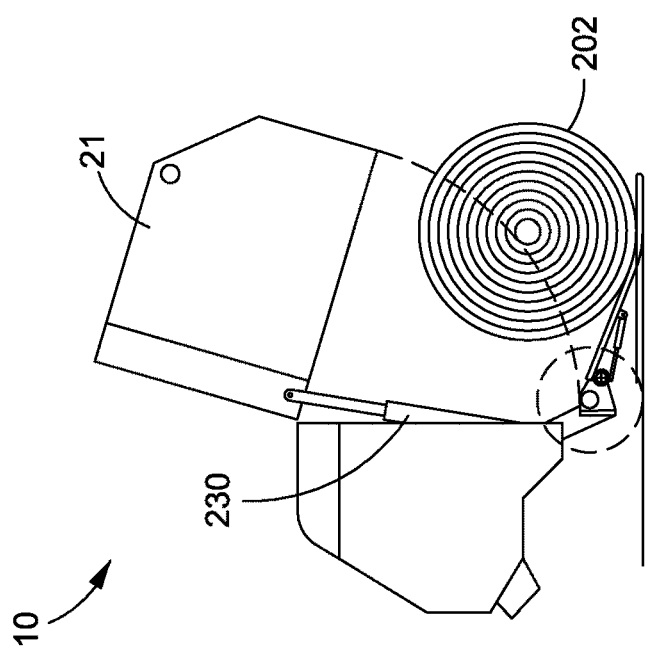
FIG. 3B illustrates the tailgate of FIG. 3A after the tailgate has begun closing and the ejected bale has rolled away from the baler.

FIGS. 3A and 3B provide side views of the baler 10 (without the tractor 100 or other equipment connected to the baler 10) with the tailgate 21 in an open position and in a position in which closing of the tailgate 21 has commenced, respectively. The tailgate 21 is illustrated in the closed position in dashed lines. In FIG. 3A, the bale 202 is fully formed and wrapped and the tailgate 21 is in the open position to allow the bale 202 to be ejected. In FIG. 3B, the bale 202 has been ejected and closing of the tailgate 21 has commenced.

In many known baling systems, the operator manipulates switches in the operator cabin, which may be part of the towing vehicle, to control hydraulic functions of the baler. For example, the operator may move a switch in the cabin forward to extend a tailgate of the baler using a tailgate actuator and move the same switch in the reverse direction to retract the tailgate using the tailgate actuator. When the operator moves the switch, hydraulic fluid flows in the system to either extend or retract the tailgate, depending on the direction of fluid flow. Hydraulic fluid can be pressurized to flow to a first port of the tailgate actuator to extend the tailgate and flow to a second port of the tailgate actuator to retract the tailgate.

In addition to the physical connection of the baler to the towing vehicle for towing the baler, many baling systems also have hydraulic connections between the hydraulic components of the baler and the hydraulic system of the tractor. In such configurations, it is imperative that the fluid lines of the hydraulic system are fluidly coupled to the correct ports of the hydraulically driven component of the baler. Incorrect coupling of the fluid lines to the ports can result in the component operating in an unintended manner.

Figure 4:
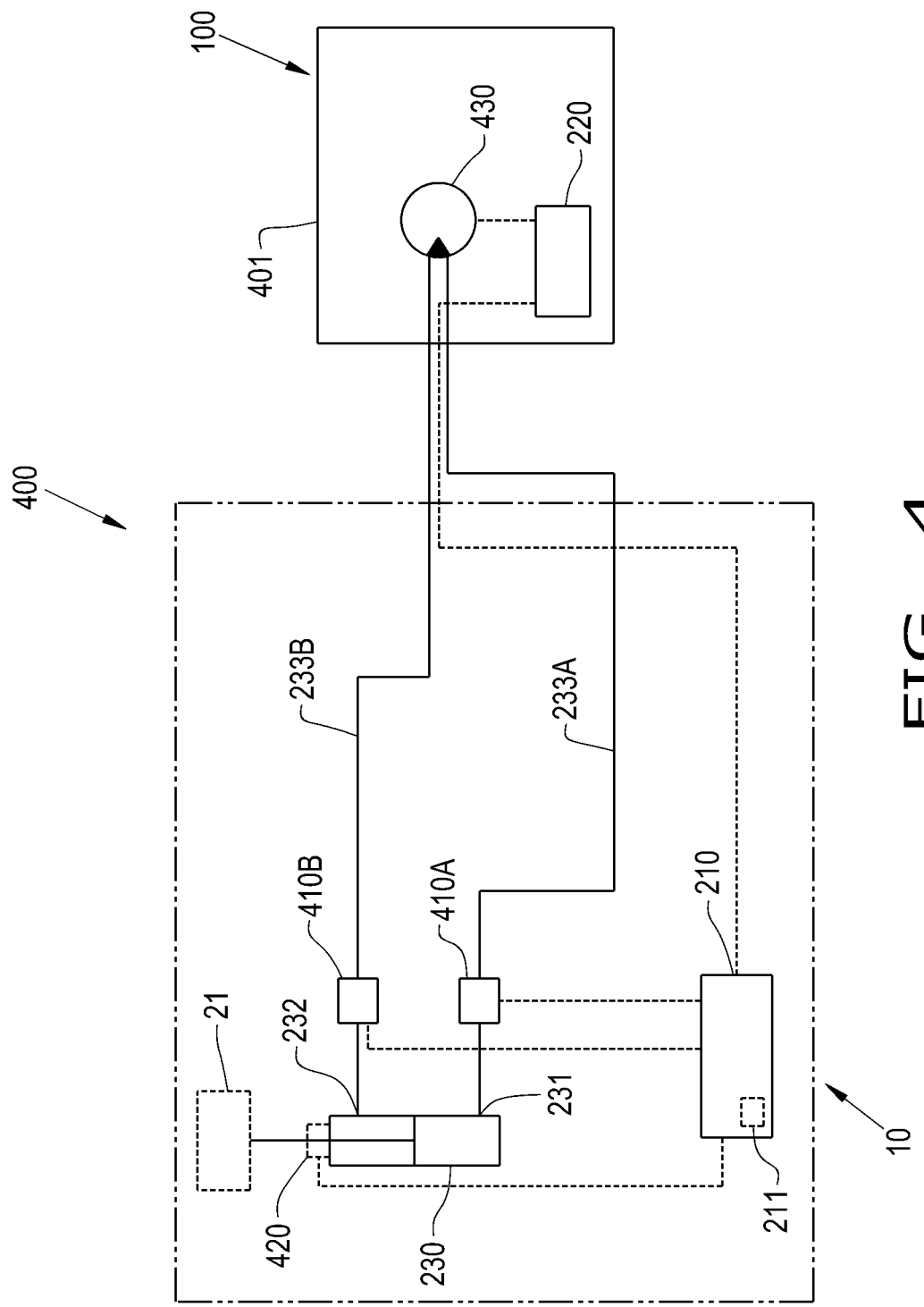
FIG. 4 illustrates a schematic of the baler and tractor of FIG. 2 with a hydraulically driven component in a first position prior to a controller entering a learning mode.
Figure 5:
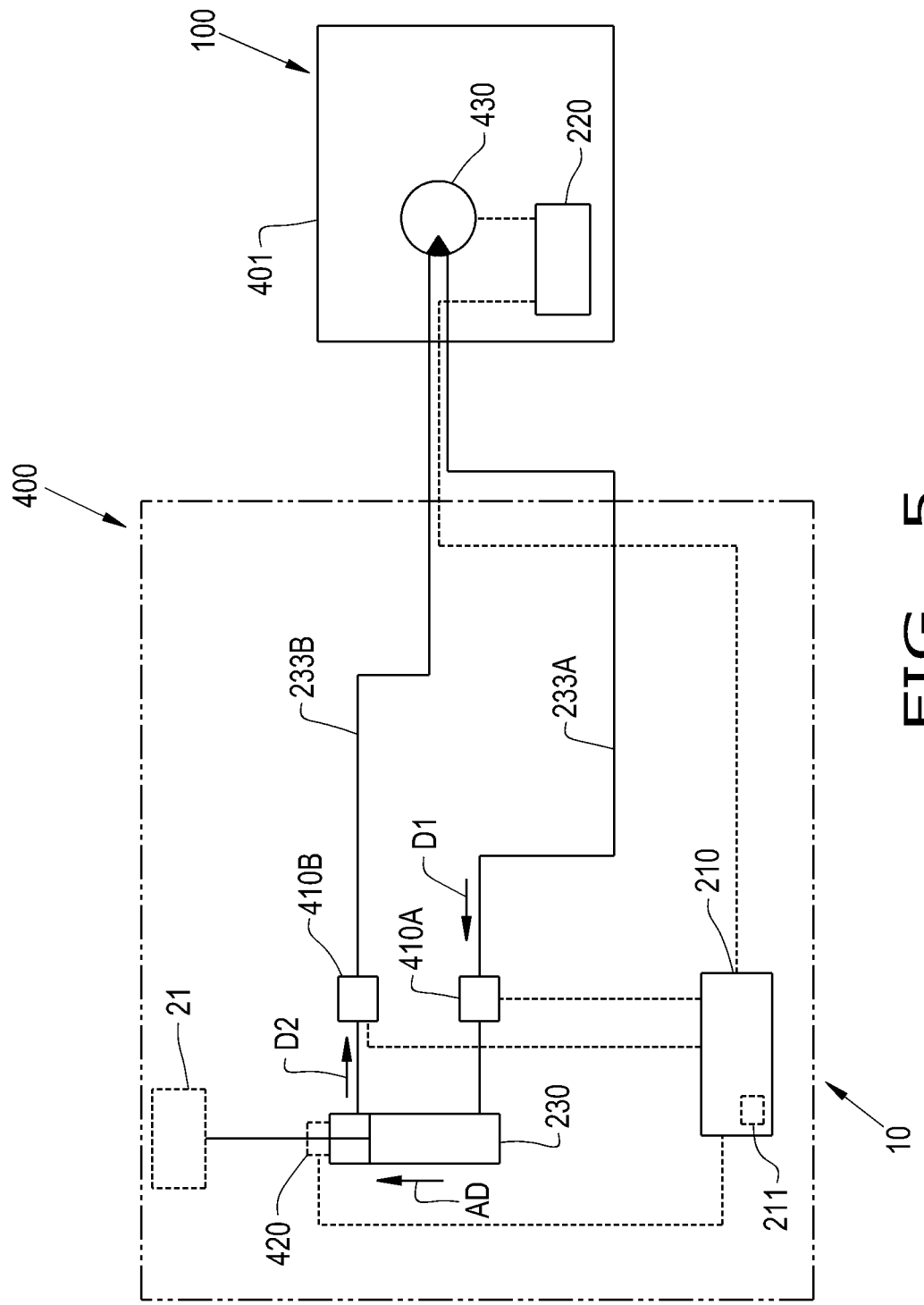
FIG. 5 illustrates a schematic of the baler and tractor of FIG. 4 after the controller has entered the learning mode and the hydraulically driven component has undergone a driven movement to a second position from the first position.

To address some of the previously described issues of known agricultural baling systems, and referring now to FIGS. 4 and 5, an exemplary embodiment of a hydraulic system 400 provided according to the present disclosure includes a hydraulic motor 430 that is carried by a chassis 401 of the tractor 100 and fluidly coupled to a hydraulically driven component, such as the tailgate actuator 230. The hydraulic motor 430 is configured to output pressurized fluid to the hydraulically driven component 230 and at least one flow sensor, illustrated as two flow sensors 410A, 410B, is associated with the hydraulically driven component 230. For convenience of description, the "hydraulically driven component" 230 is referred to as the "tailgate actuator" further herein, but it should be appreciated that the hydraulically driven component provided according to the present disclosure may be other components that are driven by hydraulics, including but not limited to a pickup actuator that is configured to raise and lower the pickup assembly 23.

The tailgate actuator 230 is configured such that fluid flow between the hydraulic motor 430 and the tailgate actuator 230 causes the tailgate actuator 230 to move between a first position and a second position to, for example, extend or retract the tailgate 21, as illustrated in FIGS. 3A and 3B. The tailgate 21 may be extended, for example, by fluid flowing to a first port 231 of the tailgate actuator 230; the tailgate 21 may then be retracted by fluid flowing to a second port 232 of the tailgate actuator 230. Each of the flow sensors 410A, 410B may be associated with a respective port 231, 232 of the tailgate actuator 230 so the sensors 410A, 410B can output flow signals corresponding to fluid flow between the tailgate actuator 230 and the hydraulic motor 430. The flow sensors 410A, 410B may, for example, be fluidly coupled to a respective fluid line 233A, 233B coupling the ports 231, 232 to the hydraulic motor 430.

The hydraulic motor 430 and flow sensors 410A, 410B are operatively coupled to a controller. In some embodiments, the coupled controller is the baler controller 210 or the tractor controller 220 described further herein. In some embodiments, an ISOBUS system includes both the baler controller 210 and the tractor controller 220 and is the coupled controller described further herein. For ease of description, the baler controller 210 is described as the coupled controller further herein, but it should be appreciated that the "controller" that is coupled to the hydraulic motor 430 and the flow sensors 410A, 410B may be one or more different controllers or a system including the baler controller 210.

The controller 210 is configured to enter a learning mode to learn a driven movement of the tailgate actuator 230, or other hydraulically driven component, from the first position to the second position. To learn the driven movement, the controller 210 is configured to determine fluid flow between the hydraulic motor and the hydraulically driven component during the driven movement while in the learning mode and associate the determined fluid flow with the driven movement. The controller 210 may, for example, monitor the output flow signals from the flow sensors 410A, 410B while in the learning mode to determine, e.g., a direction of fluid flow past the sensors 410A, 410B and associate this fluid flow with the driven movement. After associating the fluid flow with the driven movement, the controller 210 outputs control signals to the hydraulic motor 430 to reproduce the associated fluid flow and thus reproduce the driven movement.

For example, and referring specifically to FIGS. 4 and 5, the controller 210 may enter the learning mode and monitor signal output from the flow sensors 410A, 410B during the learning mode to determine and associate the fluid flow that occurs during extension of the tailgate actuator 230 to open the tailgate 21. Referring specifically to FIG. 4, it is illustrated that there is no fluid flow in the hydraulic system 400 so there is no movement of the tailgate actuator 230 or the tailgate 21. When pressurized fluid flows from the hydraulic motor 430 to the first port 231 of the tailgate actuator 230, as illustrated in FIG. 5, the first flow sensor 410A can output flow signals to the controller 210 that correspond to fluid flowing in a first direction D1 from the hydraulic motor 430 toward the first port 231. Similarly, the second flow sensor 410B can output flow signals to the controller 210 that correspond to fluid flowing in a second direction D2 from the second port 232 toward the hydraulic motor 430. This fluid flow causes a driven movement of the tailgate actuator 230 to extend the tailgate 21, which can be associated with the driven movement by the controller 210. The controller 210 may, for example, store the associated fluid flow in a memory 211. The controller 210 can also monitor power delivery to the hydraulic motor 430 to determine how the hydraulic motor 430 is functioning during the driven movement. Once the controller 210 associates the fluid flow with a respective driven movement, such as extending the tailgate 21, the controller 210 outputs control signals to the hydraulic motor 430 to reproduce the fluid flow, i.e., cause fluid in the fluid line 233A to flow in the direction D1 and fluid in the fluid line 233B to flow in the direction D2, and reproduce extension of the tailgate 21. The controller 210 may output control signals based on the function of the hydraulic motor 430 during the driven movement and/or based on defined relationships between function of the hydraulic motor 430 and fluid flow in the hydraulic system 400.

The controller 210 can similarly enter the learning mode to associate fluid flow in the hydraulic system 400 during retraction of the tailgate actuator 230 to close the tailgate 21, and associate these fluid flows with the driven movement of retracting the tailgate actuator 230. Alternatively, the controller 210 may be configured to output control signals to the hydraulic motor 430 to reverse the fluid flows associated with a driven movement, such as extension of the tailgate actuator 230, and produce an opposite driven movement, in which case entering the learning mode to learn the opposite driven movement, such as retraction of the tailgate actuator 230, may be unnecessary. It should thus be appreciated that the controller 210 can determine a variety of fluid flows and associate the fluid flows with different driven movements in order to reproduce the associated fluid flows and thus the driven movements.

In some embodiments, and referring again to FIGS. 4 and 5, a position sensor 420 is associated with the tailgate actuator 230 and operatively coupled to the controller 210. The position sensor 420 is configured to output movement signals to the controller 210 during the driven movement, which allows the controller 210 to determine the driven movement. For example, when the tailgate actuator 230 moves from the first position (FIG. 4) to the second position (FIG. 5), the position sensor 420 can output movement signals to the controller 210 corresponding to movement of the tailgate actuator 230 in a driven direction AD. The controller 210 can determine the driven movement in the learning mode from the output movement signals; in the illustrated embodiment, the controller 210 can associate fluid flow in the first direction D1 and the second direction D2 with extension of the tailgate actuator 230 in the driven direction AD. Thus, it should be appreciated that the controller 210 can be configured to not only determine fluid flows and associate the fluid flows with a driven movement, but also determine what driven movement is associated with the fluid flows.

Figure 6:
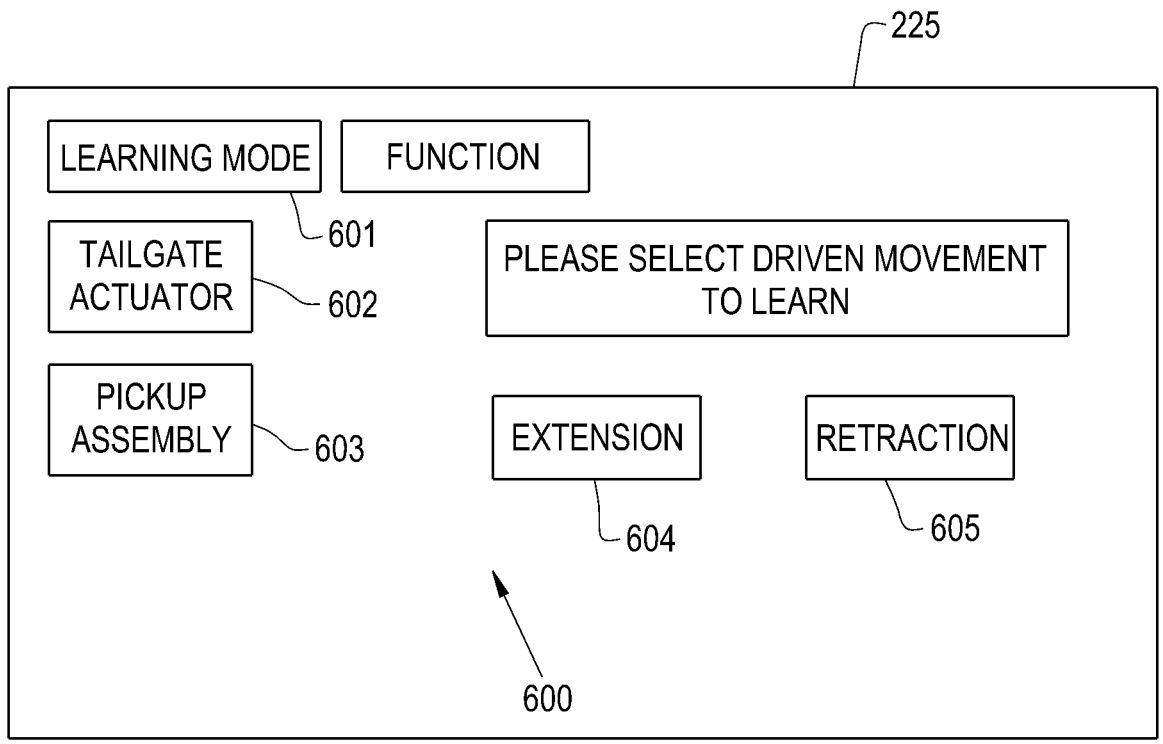
FIG. 6 illustrates an exemplary embodiment of a graphical user interface presented on a display for putting the controller in a learning mode.

In some embodiments, and referring specifically now to FIG. 6, the operator may cause the controller 210 to enter the learning mode by selecting a learning mode icon 601 in a graphic user interface (GUI) 600 that is presented on the display 225. Upon selecting the learning mode icon 601, the display 225 may present a number of component selection icons 602, 603 that correspond to different components of the baler 10. Upon the operator selecting the component selection icon 602, which is labelled "TAILGATE ACTUATOR," the display 225 may output a component selection signal corresponding to the tailgate actuator 230 to the controller 210, either directly or through the tractor controller 220 or ISOBUS system. After receiving the component selection signal, the controller 210 knows that the tailgate actuator 230 is the hydraulically driven component that is making the driven movement and may associate the tailgate actuator 230 with the driven movement. In some embodiments, the controller 210 receiving the component selection signal causes the controller 210 to enter the learning mode to learn the driven movement for the associated hydraulically driven component. However, it should be appreciated that the controller 210 may also enter the learning mode without associating a hydraulically driven component with a driven movement.

In some embodiments, selection of the component selection icon 601 may cause the GUI 600 to present driven movement icons 604, 605. As illustrated, one of the driven movement icons 604 may be labelled "EXTENSION" and correspond to extension of the tailgate actuator 230 and the other driven movement icon 605 may be labelled "RETRACTION" and correspond to retraction of the tailgate actuator 230. Selection of one of the driven movement icons 604, 605 can cause the display 225 to output a corresponding driven movement signal to the controller 210, which may then enter the learning mode to learn the corresponding driven movement by the selected hydraulically driven component. It should thus be appreciated that the controller 210 can be configured to allow an operator to manually input information to the controller 210 for learning how to reproduce driven movements in the hydraulic system 400. As previously described, in some embodiments the controller 210 automatically determines what the driven movement of the hydraulically driven component is, based on signals from the position sensor 420 associated with the hydraulically driven component, which can supplement or eliminate the need for manual input by an operator.

Figure 7:
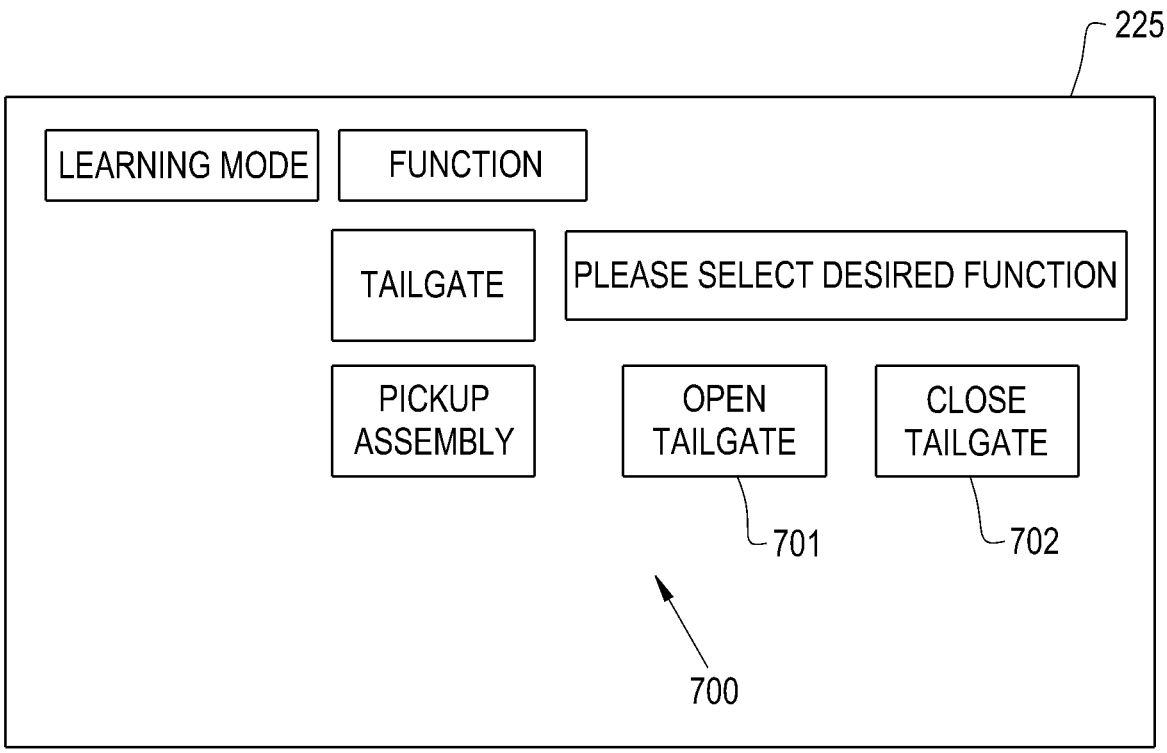
FIG. 7 illustrates another exemplary embodiment of a graphical user interface presented on a display.

Referring now to FIG. 7, another exemplary embodiment of a GUI 700 presented on the display 225 is illustrated. The GUI 700 presents movement reproduction icons 701, 702 that, when selected, output signals to the controller 210 that cause the controller 210 to output control signals to reproduce the fluid flows for the associated driven movements and reproduce the driven movements. For example, selecting the movement reproduction icon 701, which is labelled "OPEN TAILGATE", causes the display 225 to output signals to the controller 210, with the controller 210 responsively outputting control signals to the hydraulic motor 430 to reproduce the flow signals that were associated with extension of the tailgate actuator 230 while in the learning mode, causing the tailgate actuator 230 to extend and open the tailgate 21. The operator selecting the movement reproduction icon 702, which is labelled "CLOSE TAILGATE," then causes the display 225 to output signals to the controller 210 that cause the controller 210 to responsively output control signals to the hydraulic motor 430 to reproduce the flow signals that were associated with retraction of the tailgate actuator 230 while in the learning mode, causing the tailgate actuator 230 to retract and close the tailgate 21. It should be appreciated that the previously described way of causing the controller 210 to output control signals to reproduce the fluid flows and reproduce an associated driven movement is exemplary only and a variety of other ways of effecting this functionality may be provided according to the present disclosure.

Unlike known systems, the controller 210 entering the learning mode to determine fluid flows and associate the determined fluid flows with driven movements can reduce the risk of incorrect fluid line coupling requiring additional setup time. For example, the controller 210 being configured to associate the determined fluid flow with the driven movement allows the controller 210 to learn what fluid flows cause the driven movement based on system monitoring, rather than operator input. This allows the operator to simply cause the desired driven movement of the hydraulically driven component, which is monitored by the controller 210 to associate the fluid flows in the hydraulic system 400 that are needed to reproduce the driven movement. It thus does not matter how the hydraulically driven component is fluidly coupled to the hydraulic motor 430 because the controller 210 associates the determined fluid flow with the driven movement, rather than simply causing fluid flow in the hydraulic system 400 to cause an expected driven movement, which requires that the hydraulically driven component and the hydraulic motor 430 are fluidly coupled in the expected ("correct") manner. The hydraulic system 400 provided according to the present disclosure can thus be easily and accurately programmed to allow an operator to control driven movements of hydraulic components of the baling system 200 regardless of how the hydraulic components are hydraulically coupled to the hydraulic motor 430.

Figure 8:
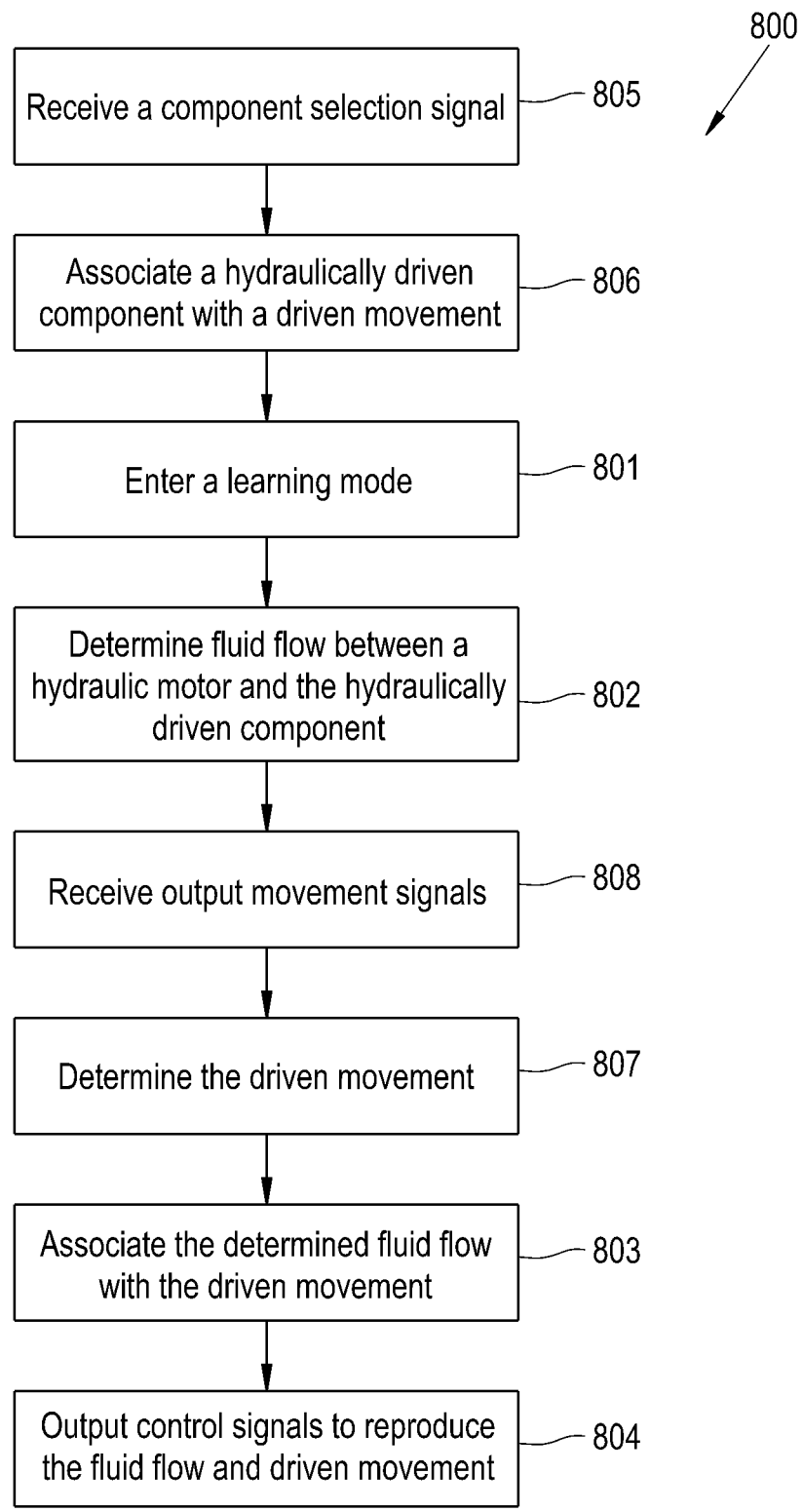
FIG. 8 illustrates an exemplary embodiment of a method of controlling an agricultural baler, provided in accordance with the present disclosure.

Referring now to FIG. 8, an exemplary embodiment of a method 800 of controlling an agricultural baler 10 provided according to the present disclosure is illustrated. The method 800 is performed by a controller, which may be the baler controller 210, the tractor controller 220, and/or an ISOBUS system incorporating one or both of the controllers 210, 220. In other words, the controller may be a part of an ISOBUS system or may be an individual controller, such as the baler controller 210. The method 800 includes entering 801 a learning mode to learn a driven movement of a hydraulically driven component, such as a tailgate actuator 230, from a first position to a second position. While in the learning mode, the controller 210 determines 802 fluid flow between a hydraulic motor 430 and the tailgate actuator 230 during the driven movement. The determined fluid flow causes the driven movement of the tailgate actuator 230. The controller 210 associates 803 the determined fluid flow with the driven movement and can then output 804 control signals to the hydraulic motor 430 to reproduce the associated fluid flow and reproduce the driven movement, as previously described. In some embodiments, the driven movement is extension or retraction of the tailgate actuator 230 to respectively open or close a tailgate 21 of the baler 10. The method 800 may further including receiving 805 a component selection signal from a display 225 and associating 806 the hydraulically driven component, such as the tailgate actuator 230, with the driven movement; in such embodiments, the component selection signal corresponds to the hydraulically driven component so the controller 210 can determine what component of the baler 10 is being driven. In some embodiments, receiving 805 the component selection signal causes the controller 210 to enter the learning mode.

In some embodiments, the method 800 further includes determining 807 the driven movement. The driven movement may be determined 807, for example, based on user input or, alternatively or in addition, the driven movement may be determined 807 after the controller 210 receives 808 output movement signals from a position sensor 420 associated with the hydraulically driven component, such as the tailgate actuator 230. The output position signals may correspond to a driven direction AD of the tailgate actuator 230 during the associated fluid flow and driven movement, allowing the controller 210 to determine 807 the driven movement and associate 803 the determined fluid flow with a specific driven movement.

It is to be understood that the steps of the method 800 are performed by the controller 210, 220 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 210, 220 described herein, such as the method 800, is implemented in software code or instructions which are tangibly stored on a tangible computer readable medium. The controller 210, 220 loads the software code or instructions via a direct interface with the computer readable medium or via a wired and/or wireless network. Upon loading and executing such software code or instructions by the controller 210, 220, the controller 210, 220 may perform any of the functionality of the controller 210, 220 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A hydraulic system for an agricultural baler, comprising:
  a hydraulic motor configured to output pressurized fluid;
  a hydraulically driven component fluidly coupled to the hydraulic motor such that fluid flow between the hydraulic motor and the hydraulically driven component causes the hydraulically driven component to move between a first position and a second position;
  at least one flow sensor associated with the hydraulically driven component and configured to output flow signals corresponding to fluid flow between the hydraulically driven component and the hydraulic motor; and
  a controller operatively coupled to the at least one flow sensor and the hydraulic motor, the controller being configured to:
    enter a learning mode to learn a driven movement of the hydraulically driven component from the first position to the second position;
    determine fluid flow between the hydraulic motor and the hydraulically driven component during the driven movement while in the learning mode;
    associate the determined fluid flow with the driven movement; and output control signals to the hydraulic motor to reproduce the associated fluid flow and reproduce the driven movement.

2. The hydraulic system of claim 1, wherein the hydraulically driven component is a tailgate actuator coupled to a movable tailgate.

3. The hydraulic system of claim 1, wherein the controller is configured to receive a component selection signal corresponding to the hydraulically driven component and associate the hydraulically driven component with the driven movement.

4. The hydraulic system of claim 3, wherein the controller receiving the component selection signal causes the controller to enter the learning mode.

5. The hydraulic system of claim 1, wherein the controller comprises or is part of an ISOBUS system.

6. The hydraulic system of claim 1, further comprising a position sensor associated with the hydraulically driven component, operatively coupled to the controller, and configured to output movement signals to the controller during the driven movement.

7. The hydraulic system of claim 6, wherein the controller is configured to determine the driven movement from the output movement signals.

8. An agricultural baling system, comprising:
a towing vehicle comprising a chassis and a hydraulic motor carried by the chassis and configured to output pressurized fluid; and
a baler coupled to the towing vehicle and comprising:
a hydraulically driven component fluidly coupled to the hydraulic motor such that fluid flow between the hydraulic motor and the hydraulically driven component causes the hydraulically driven component to move between a first position and a second position;
at least one flow sensor associated with the hydraulically driven component and configured to output flow signals corresponding to fluid flow between the hydraulically driven component and the hydraulic motor; and
a baler controller operatively coupled to the at least one flow sensor and the hydraulic motor, the baler controller being configured to:
enter a learning mode to learn a driven movement of the hydraulically driven component from the first position to the second position;
determine fluid flow between the hydraulic motor and the hydraulically driven component during the driven movement while in the learning mode;
associate the determined fluid flow with the driven movement; and
output control signals to the hydraulic motor to reproduce the associated fluid flow and reproduce the driven movement.

9. The baling system of claim 8, wherein the hydraulically driven component is a tailgate actuator coupled to a movable tailgate of the baler.

10. The baling system of claim 8, further comprising a display operatively coupled to the baler controller and configured to output a component selection signal, wherein the baler controller is configured to receive the component selection signal corresponding to the hydraulically driven component and associate the hydraulically driven component with the driven movement.

11. The baling system of claim 10, wherein the baler controller receiving the component selection signal causes the baler controller to enter the learning mode.

12. The baling system of claim 8, wherein the towing vehicle comprises a vehicle controller operatively coupled to the baler controller to form an ISOBUS system.

13. The baling system of claim 8, further comprising a position sensor associated with the hydraulically driven component, operatively coupled to the baler controller, and configured to output movement signals to the baler controller during the driven movement.

14. The baling system of claim 13, wherein the baler controller is configured to determine the driven movement from the output movement signals.

15. A method of controlling an agricultural baler, the method being performed by a controller and comprising:
entering a learning mode to learn a driven movement of a hydraulically driven component from a first position to a second position;
determining fluid flow between a hydraulic motor and the hydraulically driven component during the driven movement while in the learning mode, the fluid flow causing the driven movement of the hydraulically driven component;
associating the determined fluid flow with the driven movement; and
outputting control signals to the hydraulic motor to reproduce the associated fluid flow and reproduce the driven movement.

16. The method of claim 15, wherein reproducing the driven movement opens or closes a tailgate of the baler.

17. The method of claim 15, further comprising receiving a component selection signal from a display and associating the hydraulically driven component with the driven movement, the component selection signal corresponding to the hydraulically driven component.

18. The method of claim 17, wherein receiving the component selection signal causes the controller to enter the learning mode.

19. The method of claim 15, wherein the controller is part of an ISOBUS system.

20. The method of claim 15, further comprising receiving output movement signals from a position sensor associated with the hydraulically driven component during the driven movement and determining the driven movement from the received movement signals.

* * * * *